United States Patent [19]

Granzow

[11] 4,257,931
[45] Mar. 24, 1981

[54] FLAME RETARDANT POLY(BUTYLENE TEREPHTHALATE) COMPOSITIONS COMPRISING MELAMINE PYROPHOSPHATE AND A PHOSPHONATE

[75] Inventor: Albrecht H. Granzow, Somerset, N.J.

[73] Assignee: American Cyanamid Company, Stamford, Conn.

[21] Appl. No.: 116,524

[22] Filed: Jan. 29, 1980

[51] Int. Cl.³ ............ C08K 5/34; C08K 5/52; C08K 5/53
[52] U.S. Cl. ............ 260/45.8 NE; 260/40 R; 260/45.7 P; 260/45.7 R; 260/45.8 NT; 260/45.8 R
[58] Field of Search ............ 260/45.7 P, 45.8 NE, 260/45.8 R; 106/18.14, 18.15

[56] References Cited

U.S. PATENT DOCUMENTS

| | | | |
|---|---|---|---|
| 2,286,308 | 6/1942 | Rosser | 106/18.14 |
| 2,418,525 | 4/1947 | Pollak | 106/18.14 |
| 2,685,581 | 8/1954 | Coover, Jr. | 106/18.14 |
| 2,779,691 | 1/1957 | MacMillan | 106/18.14 |
| 3,635,970 | 1/1972 | Fessler et al. | 260/45.8 NE |
| 3,866,405 | 2/1975 | Knopka | 260/45.8 R |
| 4,070,336 | 1/1978 | Birum | 260/45.8 R |
| 4,178,281 | 12/1979 | Horn, Jr. | 260/45.8 R |

*Primary Examiner*—Howard E. Schain
*Assistant Examiner*—R. A. White
*Attorney, Agent, or Firm*—Bruce F. Jacobs

[57] ABSTRACT

Flame retardant poly(butyleneterephthalate) compositions are prepared by incorporating into the polymer a combination of a pentaerythrityl phosphonate and melamine pyrophosphate.

11 Claims, No Drawings

FLAME RETARDANT POLY(BUTYLENE TEREPHTHALATE) COMPOSITIONS COMPRISING MELAMINE PYROPHOSPHATE AND A PHOSPHONATE

The invention relates to the use of pentaerythrityl phosphonates in combination with melamine pyrophosphate as flame retardants in poly(1,4-butylene terephthalate) polymers, and the compositions produced thereby.

The production of compositions which are flame retardant is of considerable commercial importance in that many articles such as castings, moldings, and laminates are required to be flame resistant. At least as important as the ability to resist burning is the resistance of such compositions to the dripping of flaming particles when they do burn, in order to prevent ignition of surrounding combustible materials, such as carpeting, draperies, or upholstery. Thus, flame-retardant compositions need to be both self-extinguishing and nondripping to be commercially useful.

Flame-retardant compositions of the pentaerythrityl phosphonates used herein, along with ammonium polyphosphate and metal oxides, such as titanium dioxide, in polyolefins are disclosed and claimed in U.S. Ser. No. 903,294, now U.S. Pat. No. 4,174,343. Combinations of this type have not been found useful in poly(1,4-butylene terephthalate) apparently due to the higher processing temperatures conventionally used with these polymers causing decomposition of the ammonium polyphosphate.

Pentaerythrityl diphosphonates, represented by Formula I below where R is alkyl of 1 to 18 carbon atoms, are disclosed in U.S. Pat. No. 3,141,032. The disclosure states that compounds where R is alkyl of at least 8 carbon atoms are preferred and that the compounds are useful as flame retardants for polyolefins.

A broader genus of pentaerythrityl diphosphonates, useful as flame retardants for polyesters, i.e. poly(ethylene terephthalate), is disclosed in German Offenleg. No. 2,630,693 wherein, in the Formula I below, R is selected from alkyl of 1 to 10 carbon atoms, cycloalkyl of 5 to 7 carbon atoms, haloalkyl of 1 to 3 carbon atoms, alkenyl of 2 to 10 carbon atoms, phenyl or halogen-substituted phenyl, phenylalkyl (or ring halogen-substituted phenylakyl) of 7 to 9 carbon atoms or phenyalkenyl (a ring halogen-substituted phenyalkenyl) of 8 to 10 carbon atoms.

The diphosphonates have not been found to be useful by themselves in flame retarding poly(1,4-butylene terephthalate) to provide self-extinguishing, non-dripping compositions. The compositions of the present invention, to the contrary, provide self-extinguishing, non-dripping compositions, whereas structurally closely related compositions do not.

In accordance with the present invention, flame retardant compositions are prepared comprising a poly(1,4-butylene terephthalate) polymer and a flame retardingly effective amount of a combination of (A), a pentaerythrityl phosphonate of Formula (I)

$$\begin{array}{c} O \\ \parallel \\ R-P \end{array} \begin{array}{c} OCH_2 \\ \\ OCH_2 \end{array} C \begin{array}{c} CH_2O \\ \\ CH_2O \end{array} \begin{array}{c} O \\ \parallel \\ P-R \end{array}$$

wherein R is selected from —CN, —CH₃,

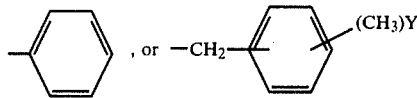

wherein y is 0 to 4; and (B), melamine pyrophosphate.

In the preferred embodiments of this invention, R is benzyl, methyl, or phenyl.

The pentaerythrityl diphosphonate compounds may be readily prepared by known procedures. The methyl and phenyl derivatives may be prepared by reacting, respectively, methylphosphonic dichloride or phenylphosphonic dichloride with pentaerythritol in methylene chloride or dioxane solvent at about 50° C., or in the absence of a solvent.

The compounds in general may be prepared via an Arbuzov-type rearrangement, in the presence or absence of a solvent, e.g., dioxane, by reacting an appropriate active halogen compound, e.g., benzyl chloride (bromide), with a suitable dialkyl pentaerythrityl diphosphite, e.g., diethyl pentaerythrityl diphosphite. The preparation of the pentaerythrityl phosphonates employed in the present invention is disclosed in U.S. Ser. No. 903,294, incorporated herein by reference.

In addition to a pentaerythrityl diphosphonate compound, the flame-retardant compositions of the present invention further contain melamine pyrophosphate which is commercially available and can be prepared by conventional methods such as that disclosed in U.S.S.R. Pat. No. 67,616 (CA Vol 43; pg. 3473), or as shown by Vol'fronich et al., Izv. Akad. Nauk SSR, Otd. Khim Nauk No. 6 (1946) pages 571–579.

By poly(1,4-butylene terephthalate) polymer herein is meant the homopolymer thereof as well as the known copolymers thereof with conventional monomers.

The pentaerythrityl diphosphonate and melamine pyrophosphate combination is useful as a flame retardant when incorporated into poly(1,4-butylene terephthalate) in a flame-retarding amount, i.e., a total amount from about 25 to about 40 percent by weight, based on the weight of the composition. The weight ratio of pentaerythrityl diphosphonate to melamine pyrophosphate preferably may range from aboout 5:1 to 1:5 to provide a self-extinguishing formulation in accordance with the present invention. Preferably the ratio is from 1:1 to 1:3, and most preferably the ratio is essentially 1:1 to yield superior flame retardancy.

Optionally, to further improve the flame retardant compositions of the present invention, various oxides and/or carbonates may be added. Generally they are added to the polymer in amounts ranging from about 0.25 to 5 percent by weight, based on the weight of the polymer. Useful compounds include alkali metal carbonates, such as sodium carbonate, potassium carbonate, etc.; alkaline earth metal oxides such as barium oxide, magnesium oxide, etc.; alkaline earth metal carbonates, such as magnesium carbonate, calcium carbonate, etc.; Group IV-A etal oxides, such as silicon dioxide, stanic oxide, etc.; titanium dioxide, zinc oxide, aluminum oxide, antimony oxide, and the like.

The flame-retardant phosphonate and melamine pyrophosphate, in combinations as described, may be added to the polymer as such, or as individual components, by any known method, such as by milling the polymer and the components on, for example, a two-roll mill, in a Banbury mixer, etc., by molding the components and the polymer simultaneously, or by extruding the polymer and components, or by merely blending all the ingredients together in powder form and thereafter forming the desired ultimate product. Additionally, the flame-retardant components or combination may be added during the production of the polymer, i.e., during polymerization, provided the catalyst, conditions, and other ingredients of the polymerization are inert thereto.

It is also within the scope of this invention to incorporate such common ingredients as plasticizers, dyes, pigments, heat and light stabilizers, antioxidants, antistatic agents, photochromic materials, and the like, into the polymer composition.

In the following examples, which are presented merely for the purpose of illustrating the present invention, all parts and percents are by weight unless otherwise specified.

EXAMPLE 1

Following the procedures set forth in U.S. Ser. No. 903,294, a pentaerythrityl phosphonate of Formula I was prepared wherein R was

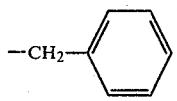

EXAMPLE 2

A dry blend (10 grams) of poly(butylene terephthalate) containing the flame retardant additive, or mixture of additives, under test was extruded through a Melt Index Apparatus (described in ASTM D-1238) at 250° C. to give a cylindrical extrudate 3–5 inches in length and 0.25 inch in diameter. The extrudate was subjected to the following flammability tests methods.

A. Vertical Flammability Rating: (described in Underwriters Laboratories Test UL-94, Vertical Test Method 3.10–3.15, September, 1973).

Each sample, clamped in a vertical position, is ignited with a ¾-inch blue flame for 10 seconds. The test flame is withdrawn and the duration of the flaming before extinguishment is recorded. If flaming ceases within 25 seconds, the test flame is again applied for 10 seconds, and the flame is withdrawn. If the flame extinguishment time does not exceed 5 seconds for either flame application and the sample does not drip flaming droplets, it is rated V-0. If the flame extinguishment time for either flame application is between 5 and 25 seconds and the sample does not drip flaming droplets, it is rated V-1. If the flame extinguishment time for either flame application is less than 25 seconds and the sample drips flaming droplets, it is rated V-2. If the flame extinguishment time is greater than 25 seconds for either flame application, it is rated "free-burning" (FB), and it is considered as failing by this test.

B. Oxygen Index Flammability Rating

The above prepared cylindrical extrudates were also subjected to the Oxygen Index Flammability Test Method, described in ASTM 2863-74. The higher the oxygen index number, the better the flame retardancy.

Compositions containing dibenzyl pentaerythrityl diphosphonate (DBPD), and melamine pyrophosphate (MPP), alone and in combination, in poly(1,4-butylene terephthalate) (PBT) were tested by the above described methods. It was found that whereas DBPD and MPP alone, at a concentration of 30% by weight, gave V-2 ratings and oxygen ratings of 24.1 and 23.2, respectively, a mixture of 15% of DBPD and 15% MPP gave a rating of V-0 and an oxygen index of 28.2. The results obtained are shown in Table I.

TABLE I

| Flame Retardant and Amount | UL-94 Rating | Oxygen Index |
|---|---|---|
| NONE | FB | 19.4 |
| Ex. 1-30% | V-2 | 24.1 |
| MPP-30% | V-2 | 23.2 |
| Ex. 1-15% and MPP-15% | V-0 | 28.2 |

EXAMPLE 3

The procedure of Example 2 was repeated except varying the amounts of dibenzyl pentaerythrityl diphosphonate and melamine pyrophosphate. The results obtained are shown in Table II below.

TABLE II

| Amount of Phosphonate | Amount of MPP | UL-94 Rating | Oxygen Index |
|---|---|---|---|
| 25 | 5 | V-2 | 24.1 |
| 20 | 10 | V-2 | 24.6 |
| 15 | 15 | V-0 | 28.2 |
| 10 | 20 | V-0 | 27.1 |
| 5 | 25 | V-0 | 26.0 |

This example illustrates that a non-dripping composition requires at least one part by weight of MPP per part by weight of DBPD when the total of MPP and DBPD is about 30% by weight of the composition.

EXAMPLE 4

The following phosphonates were evaluated in poly(1,4-butylene terephthalate) using 15% of the pentaerythrityl phosphonate and 15% melamine pyrophosphate. The compositions were prepared and tested according to the methods described in Example 2. The results obtained are shown in Table III.

As can be seen, the higher dialkyl phosphonates of U.S. Pat. No. 3,141,032 are either much less effective or ineffective as compared to the phosphonates of the present invention in combination with melamine pyrophosphate to flame retard poly(1,4-butylene terephthalate).

TABLE III

| R of Formula (1) | Vertical Flammability Rating |
|---|---|
| —⟨phenyl⟩ | V-0 |
| —CH₂—⟨phenyl⟩ | V-0 |
| —CH₂—⟨phenyl with 3,5-di-CH₃⟩ | V-0 |
| —CH₂—⟨phenyl-CH₃⟩ | V-0 |
| —CH₃ | V-0 |
| —CN | V-0 |
| —C₁₀H₂₁ | V-2 |
| —C₁₈H₃₇ | FB |

What is claimed is:

1. A method of flame retarding a poly(1,4-butylene terephthalate) polymer comprising incorporating therewith an effective flame retardant amount of a combination of (A), a pentaerythrityl phosphonate of Formula (I)

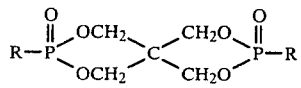

wherein R is selected from —CN, —CH₃,

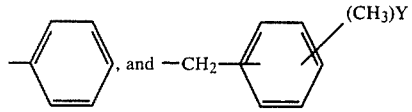

wherein y is 0 to 4, and (B), melamine pyrophosphate.

2. The method of claim 1 wherein the flame retardant amount of (A) and (B) is from about 25 to 40% by weight of the composition.

3. The method of claim 1 wherein the weight ratio of (A):(B) is from about 5:1 to 1:5.

4. The method of claim 1 wherein R is

—CH₂—⌬.

5. The method of claim 1 wherein R is

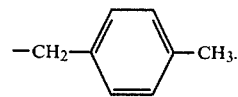

6. The method of claim 1 wherein R is

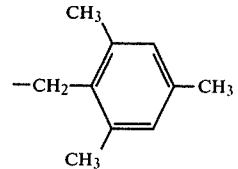

7. The method of claim 1 wherein R is —CH₃.

8. The method of claim 1 wherein R is

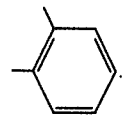

9. The method of claim 1 wherein the weight ratio of (A):(B) is from about 1:1 to 1:3.

10. The method of claim 1 wherein the weight ratio of (A):(B) is essentially 1:1.

11. The compositions produced by the method of any one of claims 1, 2, 3, 4, 5, 6, 7, 8, 9 or 10.